Feb. 12, 1935.  J. CHRISTIE ET AL  1,991,138
ASSEMBLING MACHINE FOR THIN METAL SHEETS
Filed Jan. 7, 1932   3 Sheets-Sheet 3
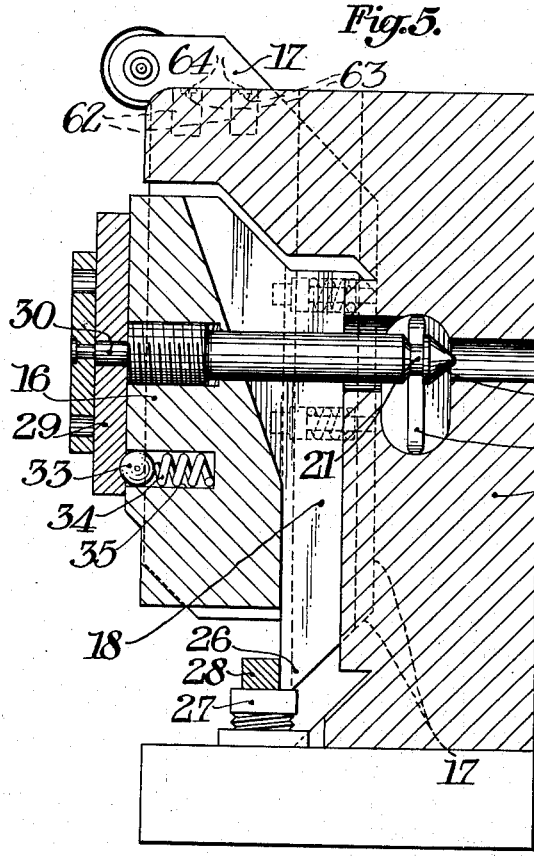
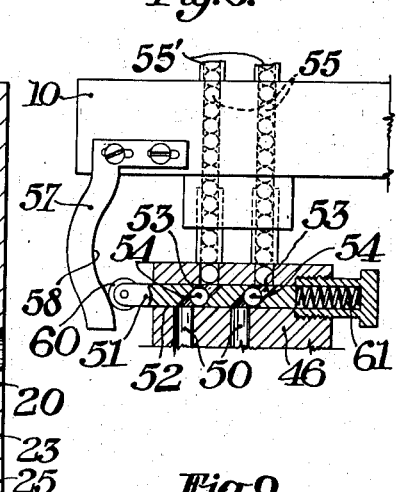
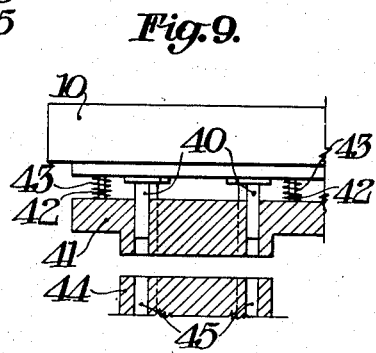
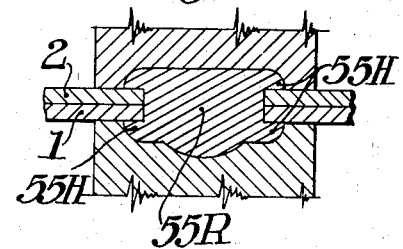
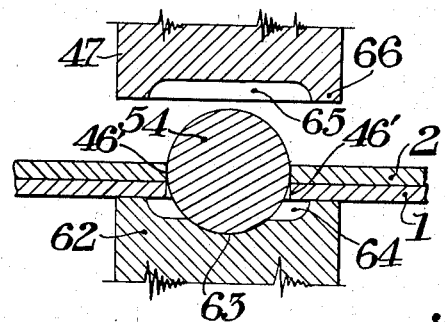
Inventors:
John Christie & Newton B. Green,
By
Attorneys

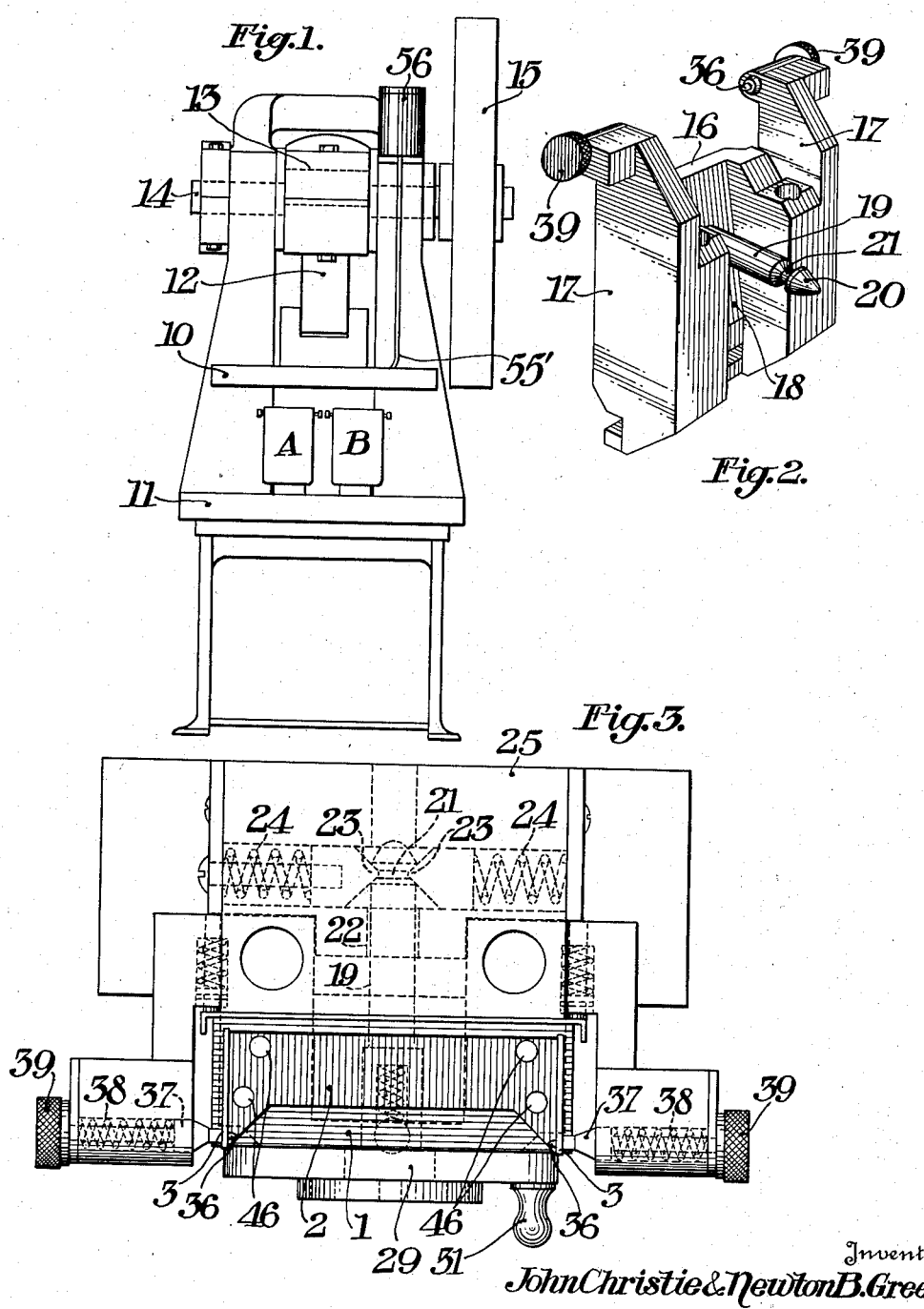

UNITED STATES PATENT OFFICE 1,991,138

ASSEMBLING MACHINE FOR THIN METAL SHEETS

John Christie and Newton B. Green, Rochester, N. Y., assignors to Eastman Kodak Company, Rochester, N. Y., a corporation of New York Application January 7, 1932, Serial No. 585,177

6 Claims. (Cl. 78—46)

This invention relates to an assembling machine and more particularly to machines for joining together relatively thin sheet metal parts. One object of our invention is to provide a machine which will unite thin metal parts at a series of different locations in a single operation. Another object of our invention is to provide a machine which will hold parts to be united in a predetermined relation. Another object of our invention is to provide a machine with several stations, each station being equipped to properly position parts to be united so that these parts may be perforated at one station and riveted at the other station. Another object of our invention is to provide a machine for riveting light metal parts together, which includes a rivet slug feeding mechanism which automatically delivers a plurality of rivets to the perforated parts to be joined together. Still another object of our invention is to provide a work-holder adapted to accurately hold parts in position for assembling and to provide a plurality of seats into which the work-holder may be accurately and rapidly located to position the parts to be assembled for different steps of the assembling operations, and other objects will appear from the following specification, the novel features being particularly pointed out in the claims at the end thereof.

In assembling light weight sheet metal parts, it has been customary to form the pieces into the proper shape and perforate these pieces, after which the perforations in the various parts are brought into proper registration and riveted by placing one rivet at a time in the different complementary apertures and thus joining the parts together. It has been found, however, in parts where considerable accuracy is required, that it is difficult to hold the apertures to the proper tolerances and it is difficult to assemble the parts properly when they have not been first clamped in a definite predetermined position.

We have designed a machine in which parts which must be accurately placed relative to each other can be assembled with considerable speed. A work-holder is provided with means for accurately positioning each of the parts to be assembled in their proper relative position. With the work so clamped in the work-holder, the parts are perforated in a single operation with as many perforations as may be desirable for the purpose. The work-holder with the parts still clamped in position is then moved to another station where rivets are accurately placed through the apertures and, since the parts are still clamped accurately in a definite position, there is no tendency of the riveting operation distorting or moving the parts relative to each other during the assembling operation.

Coming now to the drawings wherein like reference characters denote like parts throughout, Fig. 1 is a front elevation showing diagrammatically a machine which may be used in connection with our invention for operating the assembling machine.

Fig. 2 is a perspective view of a work-holder adapted to accurately position a plurality of parts to be joined together.

Fig. 3 is a top plan view of the work-holder shown in Fig. 2 seated in one of the seats of the assembling machine.

Fig. 5 is a section on line 5—5 of Fig. 4, parts being omitted for clearness.

Fig. 6 is a side elevation of the rivet-feeding mechanism.

Fig. 7 is an enlarged sectional view showing a rivet slug positioned relative to the parts to be joined together.

Fig. 8 is a view similar to Fig. 7 but with the riveting tools brought into operative position, and showing the rivet slug deformed and headed over to form a rivet for holding the parts together.

Fig. 9 is a fragmentary view, partially in section, of the perforating part of the assembling machine.

Figure 4:
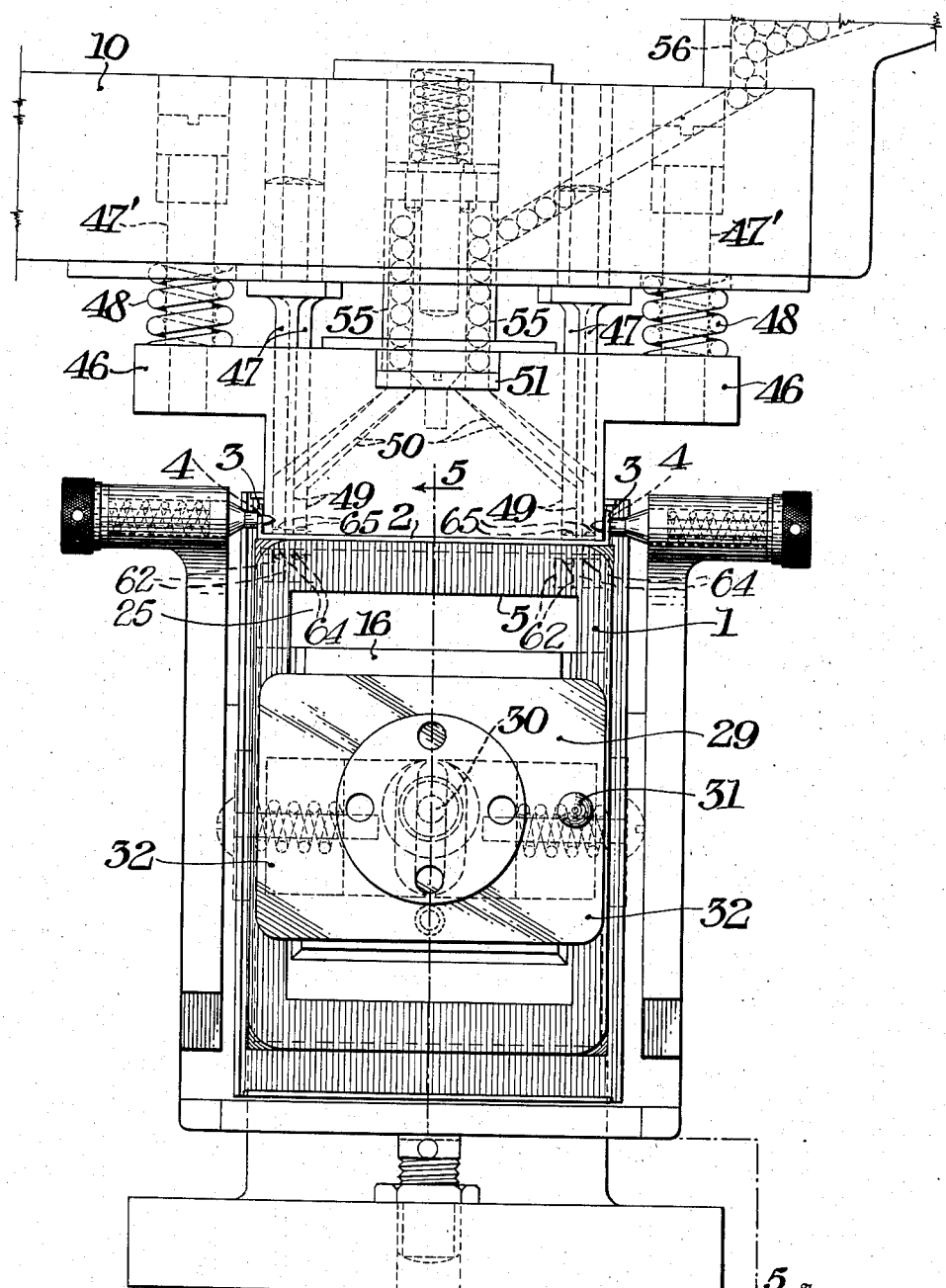
Fig. 4 is an enlarged front plan view of the work-holder seated in the riveting seat of the assembling machine.

In assembling certain camera parts which are made from light weight sheet metal, it is difficult to accurately position these parts. For instance, the body of a camera 1 may be provided with a bracket 2 which has up-turned ends 3 perforated at 4 (as best shown in Fig. 4) these perforations being later used to locate a film guiding roller. These film guiding rollers must be accurately aligned with each other, otherwise film will not wind smoothly across the exposure aperture 5 of the camera body. For the purpose of illustrating our invention, we will describe an assembling machine particularly designed for assembling these parts quickly and accurately.

Broadly speaking, our invention comprises any machine which utilizes a ram 10 which is mounted to move over a bed 11. This, as indicated in Fig. 1, may be conveniently accomplished by the ordinary type of punch press. This punch press may consist of a ram 10 connected by a crank 12 to an eccentric 13, this eccentric being operated from a shaft 14 on which there is a flywheel 15 in the usual manner, that is, the shaft 14 may be rotated one revolution at a time through the usual type of one revolution clutch from the constantly rotated fly-wheel 15, as is customary in punch press machines.

In Fig. 1, we have diagrammatically illustrated between movable ram 10 and stationary part 11, two assembling stations designated as A and B, station A being the station at which the parts may be perforated, and station B being the station in which rivet slugs may be placed in the apertures formed at station A and in which they may be headed over into rivets to hold the parts together.

In order to accurately position the parts to be joined together, we provide a work-holder, as shown in Fig. 2, although it will be understood that these work-holders are necessarily of the shape necessary to handle the particular parts to be worked upon.

In Fig. 2, the work-holder is shown as including a base 16 having side flanges 17, a slotted back 18, and a pin 19, having a tapered point 20 and an annular groove 21 extending around the tapered point. This member serves to locate the work-holder in one of the seats at stations A or B in the following manner:

As indicated in Fig. 3, the arm 19 is adapted to pass through an aperture 22 so that the annular groove 21 may be engaged by the latching members 23, these members being spring pressed by the springs 24 into engagement with the arm 19 to form a snap-latch therewith. The work-holder sides 17 (as best shown in Fig. 5) engage the sides of a seat which consists of a block 25, and the work-holder is further positioned by a tongue 26 engaging a stop 27 provided with a locating bar 28. Thus, when the work-holder is to be placed in the seat, it is only necessary to push member 26 on the stop 27 and push the work-holder into the seat with the sides of recess 18 engaging the sides of block 25 until the snap-latch, consisting of parts 21 and 23, operates to hold the work-holder in place.

In order to hold the parts operated upon in the work-holder in place, the following mechanism is used: Referring to Figs. 4 and 5, the camera body 1 is held in place by means of flanges on the camera body, which engage the base 16 of the work-holder and there is a locating plate 29 on the work-holder which can be swung about the pivot 30 by means of a handle 31 so that the edges 32 of this plate press the camera body firmly in position on the work-holder.

As indicated in Fig. 5, the plate 29 is latched in either an open or a closed position by means of a ball 33 pressed outwardly by a spring 34 lying in the aperture 35 of portion 16 of the work-holder. When the plate 29 is moved to the position shown in Fig. 4, it will retain the camera body on the work-holder. When turned at 90° to this position, the camera body can be removed from the work-holder since the bellows frame 5 is of larger dimensions than the outside of the plate 29.

In order to hold the top bracket 2 in position with the apertured ears 3 in proper position relative to the camera body 1, we provide a pair of locating pins 36 which, as best shown in Fig. 3, may consist of plungers 37 pressed towards each other by springs 38, the plungers being equipped with handles 39 which may be manually pulled apart, permitting the camera bracket 2 to be located between the locating pins. With a work-holder of this type, the several parts can be very quickly positioned and when so positioned they are accurately located with respect to each other.

The work-holder, with the parts assembled thereon, can be handled as a unit. This work-holder may be inserted in the seat A, the seats A and B being both formed as shown in Fig. 3. When so seated, the camera parts are in position for the first operation which is punching the apertures which will later receive the rivets. As indicated in Fig. 9, the ram 10 carries a plurality of punches 40 which operate through an apertured block 41 which is mounted on studs 42 on which the block has a limited movement relative to the ram 10, due to the springs 43 which are put under compression as the block 41 descends on the work. At station A beneath the punches 40, there is a plate 44 and a plurality of apertures 45, mating with the punches 40, as is customary with this type machine. A single operation of the ram 10 with the tool above described perforates four apertures 46' in the camera parts as indicated in Fig. 3. With the parts still held by the work-holder, the work-holder is pulled off of the seat A and inserted in the seat B. This operation can be very quickly performed because the work-holder is merely held by the snap-latch 21—23 in each of the seats. The work is now in position for the second operation, which is the riveting operation. Referring to Fig. 4, the riveting operation is performed by automatically feeding spherical rivet slugs through guideways into the guides through which the riveting tools pass. In the co-pending applications of Emil L. Opperman the spherical rivet slugs used in our present machines are fully described and several different methods and machines for feeding such slugs and for heading them over into rivets are also shown.

In the present instance, the ram 10 is provided with the usual perforated block 46 which has limited movement on studs 47' relative to the ram, the springs 48 being under compression when the block 46 descends upon the work before the riveting tools 47 function. The riveting tools 47 are, of course, spaced in the same pattern as the perforating tools 40 and are similarly positioned with respect to seat B and, consequently, with respect to a work-holder positioned in the seat. The tools 47 are adapted to pass through tubular guideways 49 from which branch guideways 50 lead up to a rivet feeding slide 51.

This slide, as best shown in Fig. 6, is mounted on the clamping plate 46 which can move relative to the ram 10. The slide 51 passes through a slot 52 in plate 46 and is provided on each side with a pair of angularly disposed slots 53. The spherical rivet slugs 54 may be fed down through the guideways 55, which lead to a supply 56 (Fig. 1) of spherical slugs. This supply may consist of any suitable container with tubes 55' leading downwardly to the guideways 55.

Each time the plate 51 moves relative to the ram, as always occurs when the ram descends for a riveting operation, when the springs 48 (Fig. 4) are placed under compression, the slide 51 is moved by a cam 57 which is curved at 58. This bent arm serves as a cam operating against roller 60 carried by slide 51 so that longitudinal movement of the slide is accomplished when the ram 10 and the plate 46 approach and move away from each other as a spring 61 keeps roller 60 in contact with cam 58.

This longitudinal movement is only a short distance, sufficient to drop the spherical slugs 54 into the guideways 50 and at each operation of the ram. This feeding device permits four rivet slugs to roll down the guideways 50, down the guides 49 into a position as shown in Fig. 7, in which they lie in the apertures 46' which have been previously made in the parts 2 and 1 which are to be assembled, and the shape of cam 58 is such that the first part of the downward movement of ram 10 drops the spherical rivet slugs which roll rapidly down guideways 50 into guideways 49 before the riveting tools 47 fill the lower part of the guideways 49 and thus the rivet slugs cannot escape being properly positioned relative to the work.

We prefer to form the riveting tools 62 which cooperate with riveting tools 47, as indicated in Fig. 7, with a central spherical depression 63 which is surrounded by an annular depression 64. The upper riveting tool 47 may have an annular depression 65 in the end 66 of the tool so that when these two tools come together as the ram 10 descends to its lowest position, the spherical slug 54 may be deformed and headed over into the shape shown at 55—R wherein the slug forms a rivet to hold plates 1 and 2 together.

It will be noted from these figures that the aperture 46' is of sufficient size to receive the spherical slug and that the thickness of the plates 1 and 2 to be joined is such that there is sufficient metal in the slug 54 to properly head over at 55—H to hold the parts properly together. Obviously, this machine will be unsuitable for joining heavy metal plates, because a spherical rivet would not then have sufficient metal to accomplish the desired end.

There is also an additional reason for having a relatively large rivet; that is, that the head portions of the rivet extend only a minimum distance away from the surface of the sheets being joined. This has a distinct advantage where compactness of the assembled sheets is desired.

Our improvement lies in the complete assembling machine which greatly facilitates joining thin metal plates together, particularly where a high degree of accuracy is required and where it is necessary to place a plurality of rivets in the parts to hold them properly.

It is obvious that the preferred embodiment which we have described is only one form of a machine which may be constructed in accordance with our invention, and it is possible to perforate parts being assembled with a large number of apertures and to place simultaneously a large number of rivets in accordance with our invention. We, therefore, contemplate as within the scope of our invention all such modifications as may come within the terms of the following claims.

Having now described our invention, what we claim as new and desire to be secured by Letters Patent of the United States is:

1. In an assembling machine the combination with a bed and a ram moveable thereover, of a seat located beneath the ram, a plurality of cooperating tools on the bed and ram, a work holder adapted to be removably engaged in the seat and including a pair of positioning plungers adapted to engage parts and position them in an assembled relation, and cooperating elements on the work holder and seat for latching the work holder in a fixed position in the seat whereby said parts to be assembled may be fixedly positioned between said bed and ram.

2. In an assembling machine the combination with a bed and a ram moveable thereover, of a seat located beneath the ram, a plurality of cooperating tools on the bed and ram, a work holder adapted to be removably engaged in the seat and including moveably mounted work engaging members adapted to engage and position parts to be assembled, means for positioning said work holder in said seat comprising cooperating walls carried by the work holder and seat, and a spring latch adapted to hold said work holder in said seat with the parts to be assembled in position to be acted upon by the tools on the bed and ram.

3. In an assembling machine the combination with a bed and a ram moveable thereover, of a seat located beneath the ram, a plurality of cooperating tools on the bed and ram, a work holder adapted to be removably engaged in the seat and including moveably mounted work engaging members adapted to engage and position parts to be assembled, means for positioning said work holder in said seat comprising cooperating walls carried by the work holder and seat, and a spring latch comprising a grooved plunger adapted to slide through an aperture and latch members positioned to engage said groove, said plunger and aperture being carried by said work holder and seat, whereby the latter may be detachably latched to the former.

4. In an assembling machine the combination with a bed and a ram moveable thereover, of a seat located beneath the ram, a plurality of cooperating tools on the bed and ram, a work holder adapted to be removably engaged in the seat and including moveably mounted work engaging members adapted to engage and position parts to be assembled, means for positioning said work holder in said seat comprising cooperating walls carried by the work holder and seat, and a spring latch comprising a grooved plunger and an aperture adapted to receive the plunger on the work holder and seat, and a pair of latching members projecting into said aperture and adapted to engage grooved plunger by thrusting the work holder toward the seat.

5. In an assembling machine the combination with a bed and a ram moveable thereover, of a seat located beneath the ram, a plurality of cooperating tools on the bed and ram, a work holder adapted to be removably engaged in the seat and including moveably mounted work engaging members adapted to engage and position parts to be assembled, means for positioning said work holder in said seat comprising cooperating walls carried by the work holder and seat, and a spring latch comprising an elongated member and latching elements to engage said elongated member, an aperture into which said elongated member may slide, said elongated member and aperture being adapted to guide said work holder into said seat and said latching elements being adapted to retain said work holder in said seat.

6. In an assembling machine, the combination with a bed and a ram movable thereover, of a seat located beneath the ram, a work holder adapted to be carried in said seat, means for retaining parts to be assembled on the work holder, a combined guide and latch including cooperating parts on the work holder and seat adapted to guide the work holder into an operative position in the seat, said cooperating parts including a plunger, an aperture to receive the plunger and a spring actuated member included in one cooperating part and adapted to engage and hold said plunger in an operative position.

JOHN CHRISTIE.
NEWTON B. GREEN.